(12) United States Patent
Kim

(10) Patent No.: US 8,406,957 B2
(45) Date of Patent: Mar. 26, 2013

(54) METHOD FOR SETTING BASIS FOLLOWING POSITION AND SYSTEM FOR LANE-KEEPING CONTROL

(75) Inventor: Soon Tae Kim, Yongin-si (KR)

(73) Assignee: Mando Corporation, Pyeongtaek-Si (KR)

( * ) Notice: Subject to any disclaimer, the term of this patent is extended or adjusted under 35 U.S.C. 154(b) by 194 days.

(21) Appl. No.: 13/049,380

(22) Filed: Mar. 16, 2011

(65) Prior Publication Data

US 2011/0231063 A1  Sep. 22, 2011

(30) Foreign Application Priority Data

Mar. 17, 2010  (KR) ........................ 10-2010-0023713

(51) Int. Cl.
*A01B 69/00* (2006.01)
(52) U.S. Cl. ......................................................... 701/41
(58) Field of Classification Search ........................ None
See application file for complete search history.

*Primary Examiner* — Thomas Tarcza
*Assistant Examiner* — Adam Alharbi
(74) *Attorney, Agent, or Firm* — McDermott Will & Emery LLP

(57) ABSTRACT

A disclosure relates to a basis following position setting method and a lane-keeping control system, and more particularly, the disclosure relates to a method for setting a basis following position, which sets a basis following position that a vehicle follows in reflection of a driving inclination of a driver, and a system for lane-keeping control, which causes a vehicle to follow the basis following position set by the method for setting the basis following position and thus performs a lane-keeping control function in reflection of a driving inclination of a driver.

10 Claims, 6 Drawing Sheets

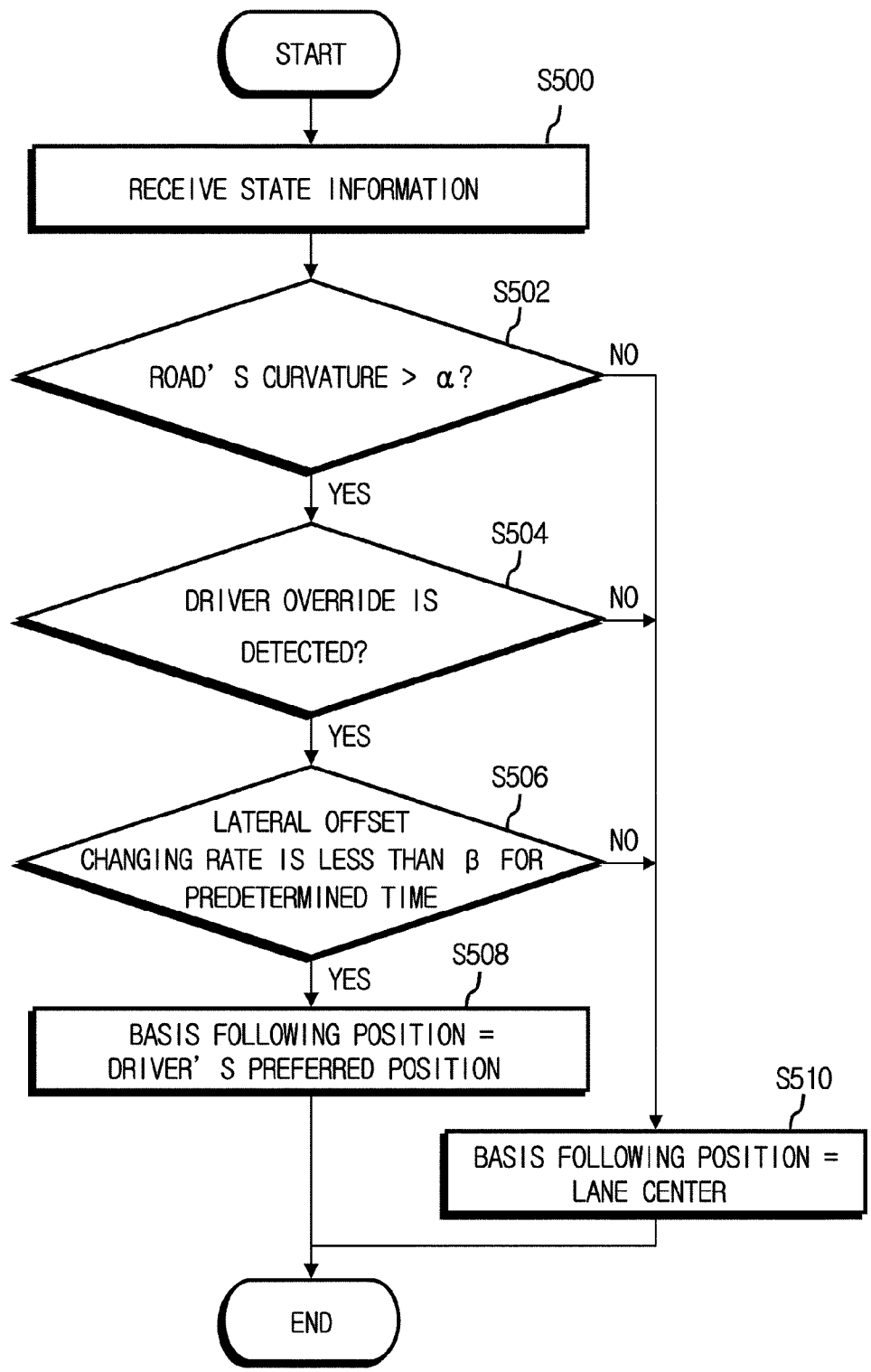

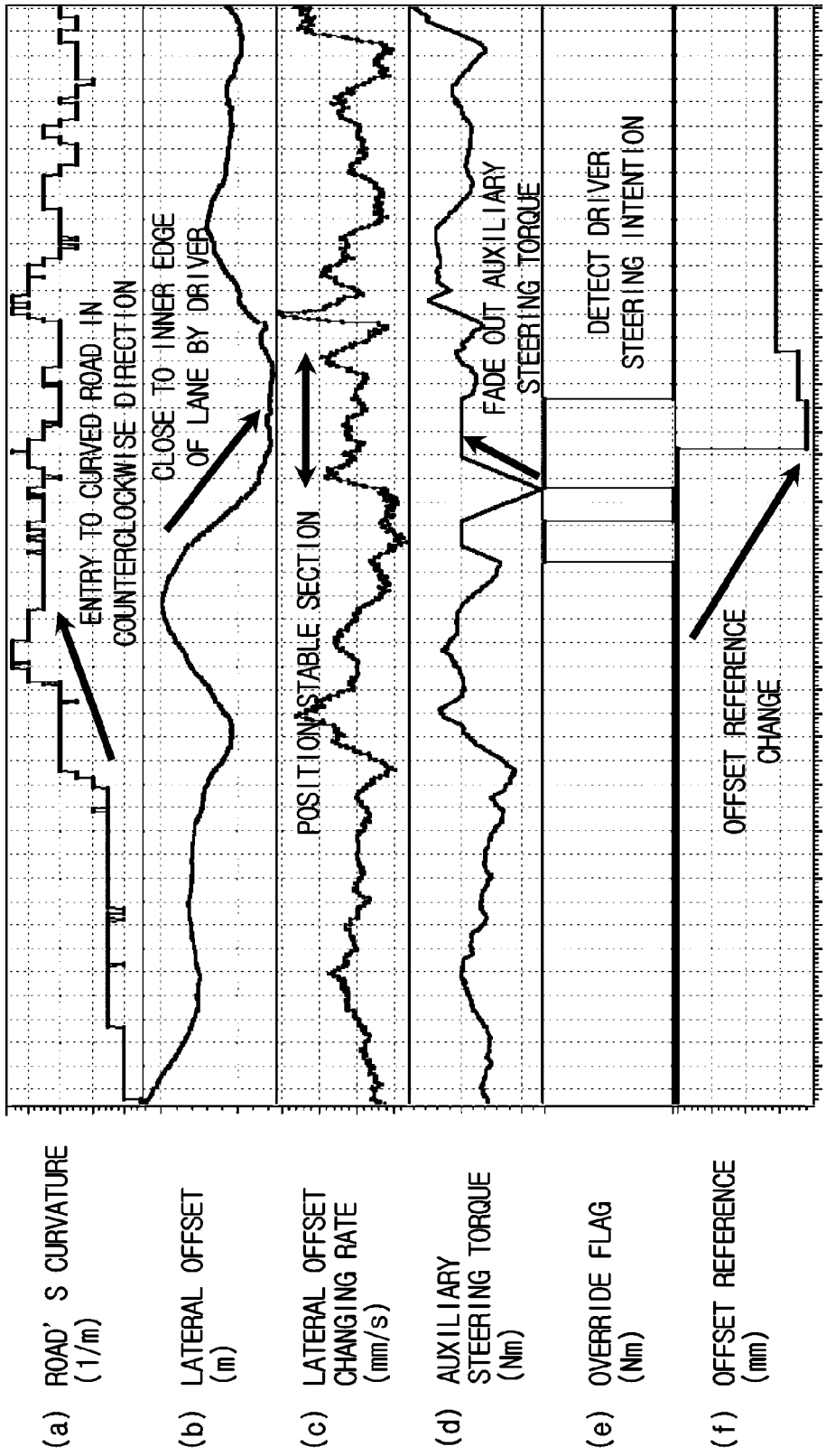

METHOD FOR SETTING BASIS FOLLOWING POSITION AND SYSTEM FOR LANE-KEEPING CONTROL

CROSS-REFERENCE TO RELATED APPLICATION

This application claims priority from and the benefit under 35 U.S.C. §19(a) of Korean Patent Application No. 10-2010-0023713, filed on Mar. 17, 2010, which is hereby incorporated by reference for all purposes as if fully set forth herein.

BACKGROUND OF THE INVENTION

1. Field of the Invention

The present invention relates to a basis following position setting method and a lane-keeping control system. More particularly, the present invention relates to a method for setting a basis following position, which sets a basis following position that a vehicle follows in reflection of a driving inclination of a driver, and a system for lane-keeping control, which causes a vehicle to follow the basis following position set by the method for setting the basis following position and thus performs a lane-keeping control function in reflection of a driving inclination of a driver.

2. Description of the Prior Art

A lane-keeping control system is an apparatus, which detects left and right lane indication lines of a lane by using a front camera of an automobile, generates an auxiliary steering torque for preventing a vehicle from escaping from the lane and thus enabling the vehicle to keep the lane based on the detected lane indication lines, and provides the auxiliary steering torque to a steering control apparatus. Such lane-keeping control systems include the Lane Centering System (LCS) performing a lane-keeping control function for causing a vehicle to follow the center of the lane, which has been being developed.

In the meantime, each of drivers has a different driving inclination. For example, in driving on a curved road, one driver pivots on the road adjacent to the inner edge of a lane of a road, one driver pivots on the road while keeping the center of a lane, and one driver pivots on the road adjacent to the outer edge of a lane of a road.

The conventional lane-keeping control system performs the lane-keeping control function through simply making a control so that the vehicle is prevented from escaping from the sensed lane or follows the center of the lane, so that it has a disadvantage that the system does not reflect the different driving inclination of each of the drivers and controls the lane-keeping.

The conventional lane-keeping control system performs the lane-keeping control without the reflection of the driving inclination of the driver, so that a problem may occur in the steering control that is performed under the lane-keeping control according to a steering intention of the driver at a specific point. This may cause a malfunction of the control function in the lane-keeping control system and an accident in the event of a serious case.

SUMMARY OF THE INVENTION

Accordingly, the present invention has been made to solve the above-mentioned problems occurring in the prior art, and an object of the present invention is to perform a lane-keeping control function in reflection of a driving inclination of a driver.

Another object of the present invention is to detect a driver override, set a basis following position based on the detected driver override, make a control so that a vehicle follows the set basis following position, and perform a lane-keeping control function, thereby providing a lane-keeping control function in reflection of the driving inclination of the driver. Especially, in lane-keeping controlling on a curved road, the present invention reflects a driving inclination of a driver.

In order to accomplish this object, there is provided a system for lane-keeping control, the system including: a sensor for sensing a lane by using a camera; a lane-keeping controller for generating an auxiliary steering torque that causes a vehicle to follow a basis following position and controlling a vehicle driving, to enable the vehicle to keep a lane; and a basis following position setting unit for changing and setting the basis following position based on the sensed lane during the controlling of the vehicle driving, wherein the basis following position setting unit includes: an entry type recognition unit for recognizing an entry type indicating that the vehicle enters a straight road or a curved road based on a road's curvature recognized from the sensed lane; and a curved road basis following position setting unit for, when it is determined that the vehicle enters the curved road, detecting a driver override, monitoring a lateral offset changing rate according to a detected driver override, and setting a specific lateral offset in a case where the monitored lateral offset changing rate is less than a predetermined value and is simultaneously maintained for a predetermined time as a basis following position.

In accordance with another aspect of the present invention, there is provided a method for setting a basis following position that a vehicle follows for a lane-keeping control in a lane-keeping control system performing a lane-keeping control, the method including the steps of: determining if a road's curvature is larger than a predetermined curvature value; when the road's curvature is larger than the predetermined curvature value, recognizing that the vehicle enters a curved road and detecting a driver override; when it is recognized that the vehicle enters the curved road and the driver override is detected, monitoring a lateral offset changing rate according to the detected driver override and identifying if the monitored lateral offset changing rate is less than a predetermined value and is simultaneously maintained for a predetermined time; and setting a driver's preferred position, which is the lateral offset in a case where the monitored lateral offset changing rate less than a predetermined value is maintained for the predetermined time, as the basis following position.

As described above, the present invention can effectively perform the lane-keeping control function in reflection of the driving inclination of the driver.

Further, above, the present invention can detect the driver override, set the basis following position based on the detected driver override, and make a control so that a vehicle follows the set basis following position, to perform the lane-keeping control function, so that it is effectively possible to provide the lane-keeping control function in reflection of the driving inclination of the driver.

Further, the present invention can set the center of the lane as the basis following position on the straight road and make a control so that the vehicle follows the center of the lane, thereby performing the lane-keeping control function on the straight road. Further, the present invention can set the basis following position based on the lateral offset changing according to the driver override on the curved road and make a control so that the vehicle follows the set basis following position, thereby performing the lane-keeping control function on the curved road. Therefore, the present invention can effectively provide a differentiated lane-keeping control function between the straight road and the curved road.

BRIEF DESCRIPTION OF THE DRAWINGS

The above and other objects, features and advantages of the present invention will be more apparent from the following detailed description taken in conjunction with the accompanying drawings, in which:

FIG. 5 is a flowchart illustrating a method of setting a basis following position by a lane-keeping control system according to an embodiment of the present invention; and FIG. 6 is a graph exemplarily illustrating a situation in which a basis following position is changed and set when a vehicle enters a curved road in a counterclockwise direction.

DETAILED DESCRIPTION OF THE PREFERRED EMBODIMENTS

Figure 1:
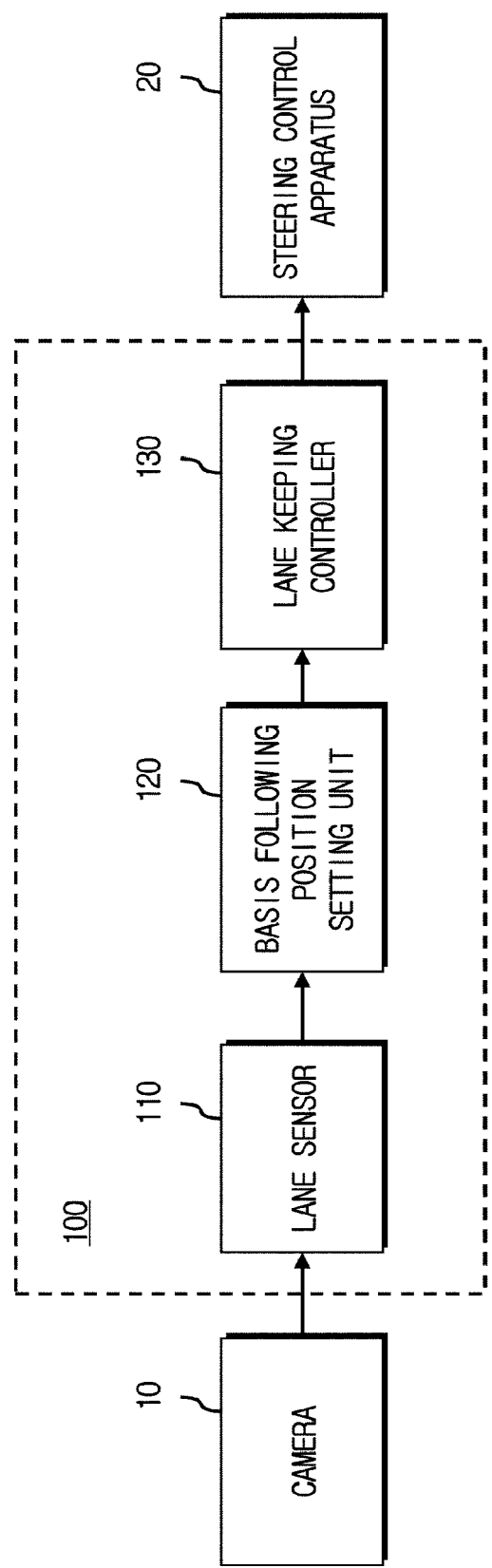
FIG. 1 is a block diagram illustrating a lane-keeping control system according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram illustrating a lane-keeping control system 100 according to an embodiment of the present invention.

Referring to FIG. 1, the lane-keeping control system 100 according to the embodiment of the present invention includes a lane sensor 110, a lane-keeping controller 130, and a basis following position setting unit 120. The lane sensor 110 senses a lane by using a camera 10. The lane-keeping controller 130 generates an auxiliary steering torque for making a vehicle follow a set basis following position, provides the generated auxiliary steering torque to a steering control apparatus 20, and controls the driving of the vehicle, so that it is possible to keep the lane. The basis following position setting unit 120 sets a basis following position based on a result of the sensed lane during the control of the driving of the vehicle by the lane-keeping controller 130. The aforementioned basis following position can be referred to as a lateral offset basis or an offset basis.

The lane sensor 110 can recognize that a vehicle enters from a straight road to a curved road when a road's curvature identified from the sensed lane is larger than a predetermined curvature value, and recognizes that a vehicle enters from a curved road to a straight road when the road's curvature is equal to or less than the predetermined curvature value.

The basis following position setting unit 120, which sets the basis following position that the vehicle follows, in order to make a control so that the vehicle can keep the lane without escaping from the lane, will be described with reference to FIG. 2 in detail.

Figure 2:
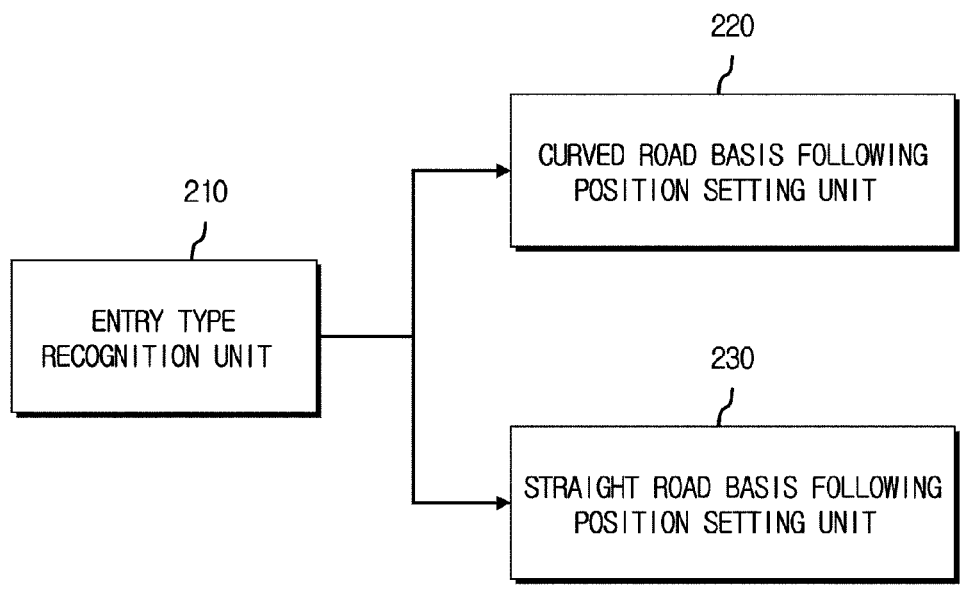
FIG. 2 is a block diagram illustrating a basis following position setting unit included in a lane-keeping control system according to an embodiment of the present invention.

FIG. 2 is a block diagram illustrating the basis following position setting unit 120 included in the lane-keeping control system 100 according to the embodiment of the present invention.

Referring to FIG. 2, the basis following position setting unit 120 includes an entry type recognition unit 210 and a curved road basis following position setting unit 220. The entry type recognition unit 210 recognizes an entry type indicating that the vehicle enters the straight road or the curved road based on the road's curvature recognized from the sensed lane by the lane sensor 110. The curved road basis following position setting unit 220 detects a driver override meaning a steering intention of the driver when the entry type of the entry to the curved road is recognized, monitors a lateral offset changing rate according to the detected driver override, and sets a specific lateral offset (which is the lateral offset corresponding to 'a driver's preferred position') when the monitored lateral offset changing rate less than a predetermined value is maintained for a predetermined time as a basis following position.

In this regard, the specific lateral offset set as the basis following position is the lateral offset in a case where the lateral offset changing rate according to the driver override is less than the predetermined value and is simultaneously maintained for the predetermined time, so that it may be information reflecting the driver's driving inclination. Therefore, the specific lateral offset set as the basis following position is the lateral offset corresponding to the preferred position of the driver, and the basis following position is information corresponding to the driver's preferred position.

The aforementioned curved road basis following position setting unit 220 fades out an auxiliary steering torque when the driver override is detected. Therefore, it is possible to interrupt the lane-keeping control before the vehicle enters the curved road.

After fading-out of the auxiliary steering torque, when the entry to a curved road is recognized and the driver override is detected, the monitored lateral offset changing rate according to the detected driver override becomes less the predetermined value and is simultaneously maintained for the predetermined time, and the driver override is released (not detected). Therefore, when the driver override is released (not detected), the curved road basis following position setting unit 220 fades in the auxiliary steering torque. Therefore, the auxiliary steering torque according to the driving inclination of the driver on the curved road is generated, so that it is possible to re-activate the lane-keeping control.

The driver override detected on the curved road basis following position setting unit 220 may include a driver override for pivoting at the inner edge of the lane (the driver override generated in a situation of FIG. 3A), a driver override for pivoting at the center of the lane of the road (the driver override generated in a situation of FIG. 3B), and a driver override pivoting at the outer edge of the lane of the road (the driver override generated in a situation of FIG. 3C), in pivoting on the curved road.

Because the specific lateral offset in a case where the lateral offset changing rate less than the predetermined value according to that the driver override is maintained for the predetermined time is set as the basis following position, the set basis following position is the driver's preferred position which reflects the driving inclination of the driver based on the detected driver override. Examples of setting the basis following positions meaning the drivers' preferred positions according to the three types of driving propensities will be described with reference to FIGS. 3A to 3C.

Figure 3:
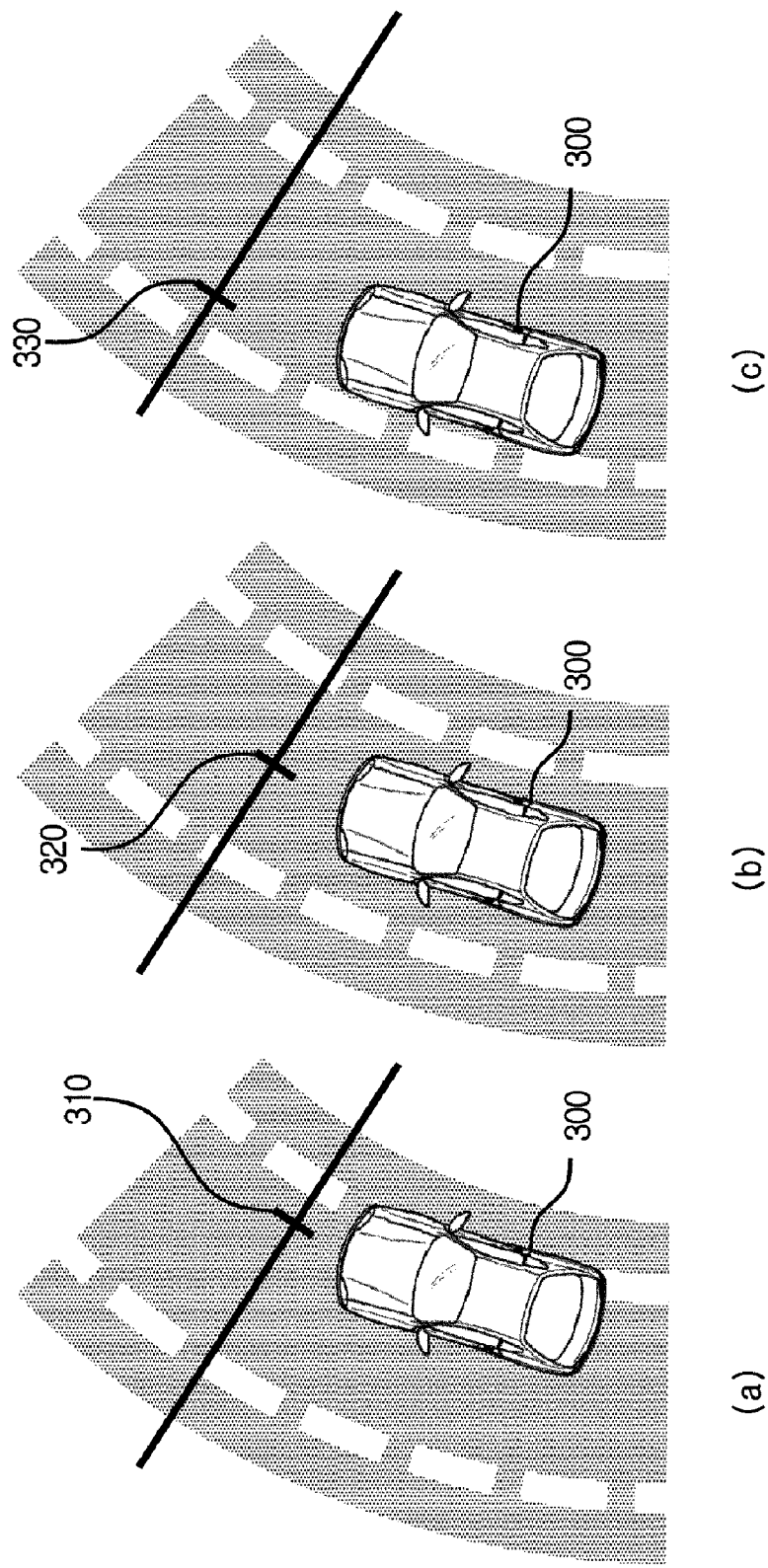
FIGS. 3A to 3C are views exemplarily illustrating basis following positions set according to three types of driving propensities of drivers when a vehicle enters a curved road.

FIGS. 3A to 3C are views exemplarily illustrating basis following positions set according to the three types of driving propensities of drivers in entering a curved road. FIGS. 3A to 3C are view illustrating the basis following positions which are set according to the three types of driving propensities of the drivers, respectively, in order to enable a vehicle 300 to keep the lane on the curved road during the entering and pivoting on the curved road. Here, specific positions 310, 320, and 330 set as the basis following positions can be expressed as the specific lateral offsets.

Referring to FIG. 3B, the basis following position set according to the driver override for the pivoting of the vehicle adjacent to a lane center 320 is the lane center 320 reflecting the driver's driving inclination of pivoting along the lane center 320. Referring to FIG. 3A, the basis following position set according to the driver override for the pivoting of the vehicle adjacent to an inner edge of the lane has a lateral offset 310 reflecting the driver's driving habit of pivoting more closely to the inner edge of the lane from the lane center 320. Referring to FIG. 3C, the basis following position set according to the driver override for the pivoting of the vehicle adjacent to an outer edge of the lane has a lateral offset 330 reflecting the driver's driving inclination of pivoting more closely to the outer edge of the lane from the lane center 320.

In the meantime, as illustrated in FIG. 2, the basis following position setting unit 120 can further include a straight road basis following position setting unit 230 for setting a lane center (referring to a center of lane indication lines in both sides) as the basis following position when the entry of the vehicle to the straight road is recognized by the entry type recognition unit 210.

In this case, the lane-keeping control unit 130 makes a control so that the corresponding vehicle follows the lane center set as the basis following position. Therefore, the lane-keeping control system 100 according to the embodiment of the present invention can be a Lane Centering System (LCS).

Figure 4:
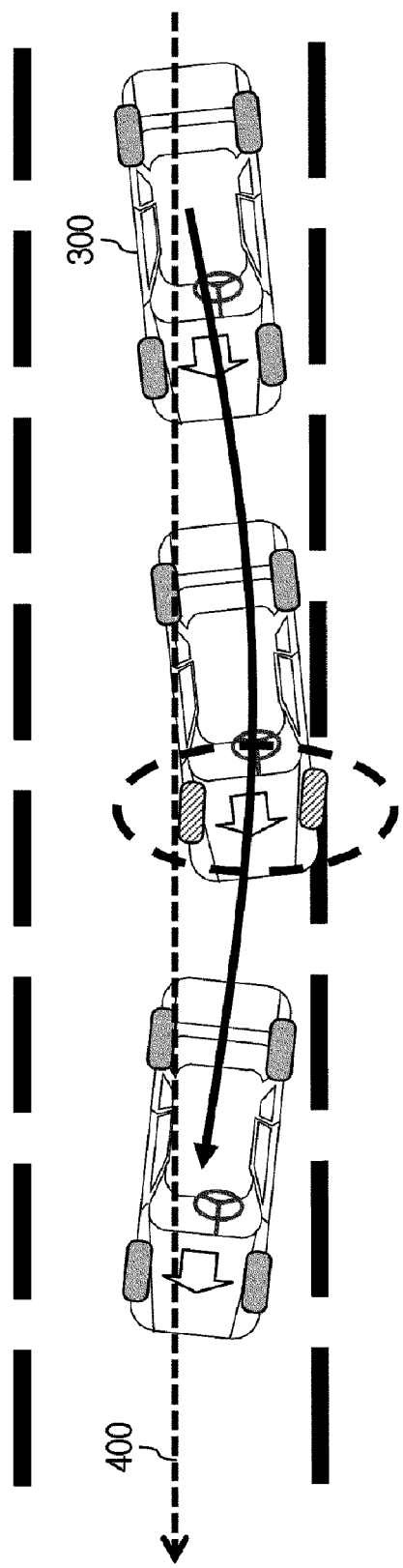
FIG. 4 is a view illustrating a situation in which the center of a lane of a road is set as a basis following position and a lane-keeping control function is performed when a vehicle enters a straight road.

FIG. 4 is a view illustrating a situation in which a lane center 400 is set as the basis following position and the lane-keeping control function of a vehicle 300 is performed when the vehicle enters the straight road.

Referring to FIG. 4, in order to make a control so that the vehicle 300 can keep the lane when the vehicle 300 enters the straight road, a lane center 400 is set as a basis following position that the vehicle 300 follows. When the vehicle 300 escapes from the lane center 400 by a predetermined distance, the escape of the vehicle 300 is detected and the auxiliary steering torque for making the vehicle 300 follow the lane center 400 set as the basis following position is generated in a converse direction of the escape, so that the steering control apparatus 200 performs the steering control. Therefore, the vehicle 300 can follow the lane center 400.

The lane-keeping control described in the specification means the control for preventing the vehicle 300 from escaping from the lane and making the vehicle 300 keep the lane. The lane-keeping control may mean the control under which the vehicle 300 can follow the basis following position in order to prevent the vehicle 300 from escaping from the basis following position by a predetermined distance and keep the lane. Further, the lane-keeping control may be a concept including the lane centering control under which the vehicle can follow the lane center set as the basis following position and keep the lane in a special case in which the lane center is set as the basis following position.

FIG. 5 is a flowchart illustrating a method of setting the basis following position by the lane-keeping control system 100 according to the embodiment of the present invention.

Referring to FIG. 5, a method for setting a basis following position that the vehicle 300 follows for the lane-keeping control in the lane-keeping control system 100 performing the lane-keeping control includes a step of receiving state information including information of a road's curvature (S500), a step of determining if the road's curvature is larger than a predetermined curvature value α (S502), a step of recognizing that the vehicle enters a curved road when the road's curvature is larger than the predetermined curvature value α, and detecting a driver override meaning a driving intention of the driver (S504), a step of, when the entry to the curved road is recognized and the driver override is detected, monitoring a lateral offset changing rate according to the detected driver override and identifying if the monitored lateral offset changing rate is less than a predetermined value β and is simultaneously maintained for a predetermined time (S506), a step of setting a driver's preferred position that is the lateral offset in a case where the monitored lateral offset changing rate less than the predetermined value β is maintained for the predetermined time as a basis following position (S508).

As a result of the determination in step S502, when the road's curvature is equal to or less than the predetermined curvature value α, it is determined that the vehicle enters the straight road and the lane center is set as the basis following position in step (S510).

As a result of the detection in step S504, when it is determined that the vehicle enters the curved road and the driver override is not detected, the lane center is set as the basis following position in step (S510).

As a result of the identification in step S506, it is identified that the monitored lateral offset changing rate is equal to or larger than a predetermined value, or the monitored lateral offset changing rate less than the predetermined value is not maintained for the predetermined time, the lane center is set as the basis following position in step (S510).

In aforementioned step S506, when the driver override is detected in step S504, an auxiliary steering torque that has been generated for the lane-keeping control is faded out, and when the monitored lateral offset changing rate less than the predetermined value is maintained for the predetermined time and the driver override is released, the auxiliary steering torque for the lane-keeping control is faded in.

FIG. 6 is a graph exemplarily illustrating a situation in which the basis following position is changed and set when the vehicle enters the curved road in a counterclockwise direction.

FIG. 6 illustrates a road's curvature change graph (a), a lateral offset graph (b), a lateral offset changing rate graph (c), an auxiliary steering torque graph (d), an override flag graph (e), and an offset reference graph (f).

Referring to the road's curvature change graph (a), it can be identified that the vehicle enters the curved road in a counterclockwise direction. Referring to the override flag graph (e), after sensing the entry to the curved road based on the change of the road's curvature, the lane-keeping control system 100 detects the driver override (the steering intention of the driver) for the pivoting of the vehicle adjacent to the inner edge of the lane.

As described above, when the driver override is detected, the lane-keeping control system 100 fades out auxiliary steering torque as shown in the auxiliary steering torque graph (d).

Referring to the lateral offset graph (b), the lateral offset is suddenly changed according to the driver override, and referring to the lateral offset changing rate graph (c), the lane-keeping control system 100 monitors if the lateral offset changing rate maintains in a stable state for a predetermined time.

Referring to the lateral offset changing rate graph (c), the lateral offset graph (b), and the offset reference graph (f), when the lateral offset changing rate has maintained in the stable state for the predetermined time according to a result of the monitored lateral offset changing rate, i.e. the steering angle change according to the steering intention of the driver is almost completed so that there is no change of the steering angle anymore, the lane-keeping control system 100 sets the lateral offset at this time as an offset reference (referred to as 'a basis following position').

Thereafter, the lane-keeping control system 100 can generate the auxiliary steering torque based on the set offset reference, provide the generated auxiliary steering torque to the steering control apparatus, and perform the lane-keeping control function in reflection of the driving inclination of the driver on the curved road.

As described above, the present invention effectively performs the lane-keeping control function in reflection of the driving inclination of the driver.

Further, the present invention detects the driver override, sets the basis following position based on the detected driver override, and makes a control so that the vehicle follows the set basis following position, to perform the lane-keeping control, thereby effectively providing the lane-keeping control function in reflection of the driving inclination of the driver.

Furthermore, the present invention sets the lane center as the basis following position and makes a control so that the vehicle follows the lane center on the straight road, to perform the lane-keeping control function on the straight road. Further, the present invention sets the basis following position based on the lateral offset changing according to the driver override and makes a control so that the vehicle follows the set basis following position on the curved road, to perform the lane-keeping control function on the curved road. Therefore, the present invention effectively provides the differentiated lane-keeping control function between the straight road and the curved road.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without escaping from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A system for lane-keeping control, the system comprising:
    a sensor for sensing a lane by using a camera;
    a lane-keeping controller for generating an auxiliary steering torque that causes a vehicle to follow a basis following position and controlling a vehicle driving, so as to enable the vehicle to keep a lane; and
    a basis following position setting unit for changing and setting the basis following position based on the sensed lane during the controlling of the vehicle driving,
    wherein the basis following position setting unit comprises:
    an entry type recognition unit for recognizing an entry type indicating that the vehicle enters a straight road or a curved road based on a road's curvature recognized from the sensed lane; and
    a curved road basis following position setting unit for, when it is determined that the vehicle enters the curved road, detecting a driver override, monitoring a lateral offset changing rate according to a detected driver override, and setting a specific lateral offset in a case where the monitored lateral offset changing rate is less than a predetermined value and is simultaneously maintained for a predetermined time as a basis following position.

2. The system as claimed in claim 1, wherein when the road's curvature recognized from the sensed lane is larger than a predetermined curvature value, the entry type recognition unit determines that the vehicle enters a curved road, and when the road's curvature recognized from the sensed lane is equal to or less than the predetermined curvature value, the entry type recognition unit determines that the vehicle enters a straight road.

3. The system as claimed in claim 1, wherein the curved road basis following position setting unit fades out the auxiliary steering torque when the driver override is detected, and fades in the auxiliary steering torque when the driver override is released.

4. The system as claimed in claim 1, wherein the detected driver override is a driver override for pivoting at an inner edge of a lane in pivoting on a curved road, a driver override for pivoting at a center of a lane, or a driver override for pivoting at an outer edge of a lane, and
the set basis following position is a driver's preferred position reflecting a driving inclination of the driver based on the detected driver override.

5. The system as claimed in claim 1, wherein the basis following position setting unit further comprises a straight road basis following position setting unit for setting a lane center as the basis following position when the entry type of entering the straight road is recognized.

6. A method for setting a basis following position that a vehicle follows for a lane-keeping control in a lane-keeping control system performing a lane-keeping control, the method comprising the steps of:
determining if a road's curvature is larger than a predetermined curvature value;
when the road's curvature is larger than the predetermined curvature value, recognizing that the vehicle enters a curved road and detecting a driver override;
when it is recognized that the vehicle enters the curved road and the driver override is detected, monitoring a lateral offset changing rate according to the detected driver override and identifying if the monitored lateral offset changing rate is less than a predetermined value and is simultaneously maintained for a predetermined time; and setting a driver's preferred position, which is the lateral offset in a case where the monitored lateral offset changing rate less than a predetermined value is maintained for the predetermined time, as the basis following position.

7. The method as claimed in claim 6, wherein when the road's curvature is equal to or less than the predetermined curvature value as a result of the determination, it is recognized that the vehicle enters a straight road and a lane center is set as the basis following position.

8. The method as claimed in claim 6, wherein when it is determined that the vehicle enters the curved road and the driver override is not detected as a result of the detection, a lane center is set as the basis following position.

9. The method as claimed in claim 6, wherein when it is identified that the monitored lateral offset changing rate is equal to or larger than the predetermined value or the monitored lateral offset changing rate less than the predetermined value is not maintained for the predetermined time as a result of the identification, a lane center is set as the basis following position.

10. The method as claimed in claim 6, wherein, in the step of the identification, when the driver override is detected, an auxiliary steering torque generated for the lane-keeping control is faded out, and
when the monitored lateral offset changing rate less than the predetermined value is maintained for the predetermined time and the driver override is released, an auxiliary steering torque for the lane-keeping control is faded in.

* * * * *